United States Patent
Yamazaki et al.

(10) Patent No.: US 6,615,578 B2
(45) Date of Patent: Sep. 9, 2003

(54) HC-DISCHARGE SUPPRESSING DEVICE FOR VEHICLE AND OPERATIONAL METHOD OF SUPPRESSING DISCHARGE OF HC

(75) Inventors: Makoto Yamazaki, Susono (JP); Takashi Suzuki, Susono (JP); Masaki Kusada, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/026,878

(22) Filed: Dec. 27, 2001

(65) Prior Publication Data

US 2002/0092296 A1 Jul. 18, 2002

(30) Foreign Application Priority Data

Jan. 16, 2001 (JP) ........................................ 2001-007488
Feb. 20, 2001 (JP) ........................................ 2001-044132

(51) Int. Cl.$^7$ ................................................. F01N 3/00
(52) U.S. Cl. ............................ 60/284; 60/285; 60/297; 60/300; 180/65.2; 180/65.4; 180/309
(58) Field of Search ........................ 60/274, 284, 297, 60/285, 286, 300, 299; 180/65.2, 65.3, 65.4, 309

(56) References Cited

U.S. PATENT DOCUMENTS 5,315,824 A * 5/1994 Takeshima .................. 60/297
5,804,148 A * 9/1998 Kanesaka et al. ........... 422/174
5,979,157 A * 11/1999 Kinugasa et al. ............. 60/274
6,170,260 B1 * 1/2001 Ishii et al. ..................... 60/297

FOREIGN PATENT DOCUMENTS

JP       A 11-210448        8/1999
JP       2000-008837 A   *  1/2000   ............. F01N/3/18
JP       A 2000-84365       3/2000

* cited by examiner

Primary Examiner—Thomas Denion
Assistant Examiner—Binh Tran
(74) Attorney, Agent, or Firm—Oliff & Berridge, PLC

(57) ABSTRACT

The invention provides an HC-discharge suppressing device and an operational method of suppressing the discharge of HC for a vehicle equipped with an engine that has an exhaust system including an HC adsorbent and an HC oxidation catalyst and that is stopped temporarily upon fulfillment of a predetermined condition for operating the vehicle. According to the device and method of the invention, the engine is controlled after cold start thereof in accordance with a temperature of the HC adsorbent and a temperature of the HC oxidation catalyst, in such a manner as to minimize the amount of HC discharged from the exhaust system to the atmosphere. Thus, if such an HC-discharge suppressing device is installed in a vehicle whose engine is frequently started at a low temperature, it becomes possible to reduce the amount of HC discharged from an exhaust system of the vehicle to the atmosphere.

24 Claims, 6 Drawing Sheets

HC-DISCHARGE SUPPRESSING DEVICE FOR VEHICLE AND OPERATIONAL METHOD OF SUPPRESSING DISCHARGE OF HC

INCORPORATION BY REFERENCE

The disclosures of Japanese Patent Applications No. 2001-007488 filed on Jan. 16, 2001 and No. 2001-044132 filed on Feb. 20, 2001, each including the specification, drawings and abstract, are incorporated herein by reference in their entirety.

BACKGROUND OF THE INVENTION

1. Field of Invention

The invention relates to suppression of the discharge of HC from an internal combustion engine of a vehicle to the atmosphere.

2. Description of Related Art

In order to prevent the atmosphere from being polluted by NOx, HC, and CO contained in exhaust gas in an internal combustion engine (hereinafter referred to as engine), present-day vehicles are normally provided with a catalytic converter including a catalyst such as a three-way catalyst having the functions of causing noxious components such as NOx, HC, and CO to react with one another and converting them into harmless components such as $N_2$, $CO_2$, and $H_2O$. Also, an HC adsorbent for temporarily adsorbing and holding a great amount of HC, which is generated especially during cold start of the engine, until the catalyst is warmed up and activated is disposed in an exhaust system upstream of the catalytic converter. The HC adsorbent, which is disposed upstream of the catalytic converter including the three-way catalyst, is either accommodated in a container different from a container for the catalytic converter or accommodated in the container for the catalytic converter while constituting a stratified structure together with the three-way catalyst.

The exhaust system of the engine is provided with the HC adsorbent and the catalytic converter that causes HC, CO, and NOx to react with one another and that converts them into harmless components such as $N_2$, $CO_2$, and $H_2O$. The HC adsorbent temporarily adsorbs and captures a great amount of HC that is generated during cold start of the engine until the catalytic converter is warmed up and activated by exhaust gas in the engine. As soon as the catalytic converter is warmed up and activated, the catalyst thus activated becomes capable of purifying the HC discharged from the HC adsorbent, which is also warmed up by exhaust gas in the engine in the meantime while losing its HC-adsorbing ability. Such a convenient HC-discharge preventing mechanism is obtained in this manner. However, such a combination of the HC adsorbent and the HC oxidation catalyst occasionally leads to the possibility that the HC adsorbent might reach a temperature at which HC is discharged before the HC oxidation catalyst reaches its activation temperature and that HC might be discharged to the atmosphere in between times.

Such a problem constitutes a serious threat especially to an economy-running vehicle equipped with an engine that is stopped temporarily if the vehicle is stopped temporarily because of a red light or traffic jam or to a hybrid vehicle that is suitably driven by either an engine or an electric motor depending on the operational state of the vehicle. This is because of the fact that the engine is often stopped temporarily, that the HC adsorbent and the catalytic converter cool off in the meantime, and that cold start of the engine may be repeated many times.

SUMMARY OF THE INVENTION

The invention has been made as a solution to such a problem. It is an object of the invention to reliably suppress the discharge of HC to the atmosphere during cold start of an engine and to thereby improve the properties of exhaust gas in a vehicle whose engine is repeatedly started with great frequency, such as an eco-run vehicle or a hybrid vehicle.

One aspect of the invention provides an HC-discharge suppressing device and an operational method of suppressing the discharge of HC in a vehicle equipped with an engine that has an exhaust system including an HC adsorbent and an HC oxidation catalyst and that is stopped temporarily upon fulfillment of a predetermined condition for operating the vehicle. According to the device and the method, the operation of the engine is controlled after cold start thereof in accordance with a temperature of the HC adsorbent and the HC oxidation catalyst, in such a manner as to minimize the amount of HC discharged from the exhaust system to the atmosphere.

As the HC adsorbent and the HC oxidation catalyst such as a three-way catalyst are heated up, the HC-holding performance of the former and the HC-purifying performance of the latter change as shown in FIG. 1. Referring to FIG. 1, the axis of ordinate represents the HC-holding performance and the HC-purifying performance. The axis of abscissa intrinsically represents temperatures of the HC adsorbent and the HC oxidation catalyst. However, since the HC adsorbent and the HC oxidation catalyst are heated by exhaust gas in the engine and gradually rise in temperature with the lapse of time during cold start of the engine, the temperatures of the HC adsorbent and the HC oxidation catalyst correspond to the elapsed time after cold start of the engine. Thus, if the operation of the engine after cold start thereof is controlled such that the rise of temperatures of the HC adsorbent and the HC oxidation catalyst, which are heated up by exhaust gas in the engine, minimizes the amount of HC discharged to the atmosphere during a period in which exhaust gas in the engine has heated up the HC adsorbent sufficiently but not the HC oxidation catalyst, the area in which a curve indicating the HC-holding performance of the HC adsorbent and a curve indicating the HC-purifying performance of the HC oxidation catalyst overlap with each other is basically increased to a maximum possible extent. This is achieved by controlling the load, air-fuel ratio, ignition timing, and the like such that they best suit the design of each engine, while the engine is being warmed up after cold start thereof. If the discharge of HC during cold start of the engine is thus suppressed to a minimum possible extent, the degree of discharge of HC improves significantly in a vehicle equipped with an engine that is repeatedly stopped temporarily in the course of traveling and that may be restarted at a low temperature after temporary stoppage thereof depending on the degree of warm-up or the period of temporary stoppage, that is, in a vehicle such as an economy-running vehicle or a hybrid vehicle.

BRIEF DESCRIPTION OF THE DRAWINGS

The above and other objects, features, advantages, technical and industrial significance of the invention will be better understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the invention will be described in more detail in terms of preferred embodiments.

Figure 2:
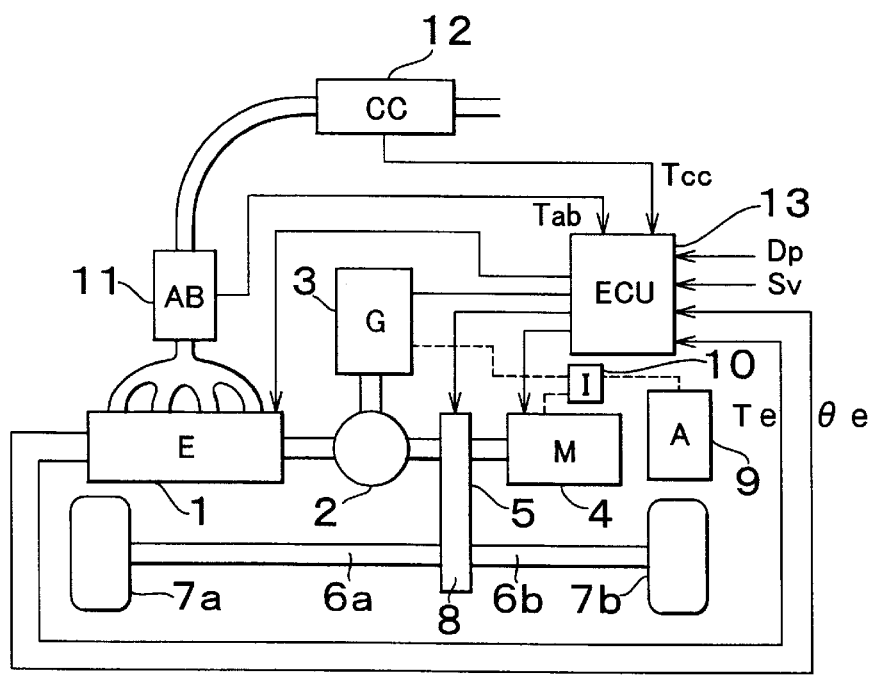
FIG. 2 is an illustrative view of an example of the drive train of a hybrid vehicle to which the HC-discharge suppressing device according to the invention is applied.

FIG. 2 is an illustrative view of an example of the structure of a power source especially in the case where the HC-discharge suppressing device according to the invention is applied to a hybrid vehicle. FIG. 2 shows an internal combustion engine 1 (hereinafter referred to as engine, E). A generator (electric power generator, G) 3 and a motor (electric motor, M) 4 are connected to the engine 1 via a drivingly connecting device 2 equipped with a planetary gear mechanism in such a manner that a power is transmitted between the generator 3 and the motor 4. The generator 3, the motor 4, and the drivingly connecting device 2 constitute a drivingly connected unit. In the illustrative view of FIG. 2, a transmission 5 is also connected to the drivingly connected unit via a shaft portion of the motor 4. The engine 1, the generator 3, and the motor 4 are connected to driving wheels 7a, 7b via the transmission 5 and a pair of axles 6a, 6b, respectively, in such a manner as to allow power transmission. In the illustrative view of FIG. 2, a differential gear 8 is installed in part of the transmission 5, so that a rotational power transmitted to the axles 6a, 6b via the transmission 5 is differentially transmitted to the driving wheels 7a, 7b respectively.

FIG. 2 also shows an accumulator (A) 9 performing the function of accumulating electric power like a battery or a capacitor. The accumulator 9 is electrically connected to the generator 3 and the motor 4 via an inverter (I) 10. By being driven by at least one of the engine 1 and the inertia of the vehicle during deceleration thereof, the generator 3 generates electric power and charges the accumulator 9. The motor 4 suitably drives the vehicle using the accumulator 9 as a power source. Although the generator 3 and the motor 4 are provided as separate units according to the structure shown in FIG. 2, they may be replaced by an integral-type unit called a motor-generator, which operates either as a motor or as a generator on the basis of the switching operation of an electric circuit. Accordingly, the means referred to as the motor in the present specification in a broader sense than the motor 4 in the embodiment shown in FIG. 2 covers both a means for performing only the function of transmitting electric power like the motor 4 and a means for performing both the functions of transmitting and generating electric power like the motor-generator. Likewise, the means referred to as the generator in the present specification in a broader sense than the generator 3 in the embodiment shown in FIG. 2 covers both a means for performing only the function of generating electric power like the generator 3 and a means for performing both the functions of transmitting and generating electric power like the motor-generator.

Figure 1:
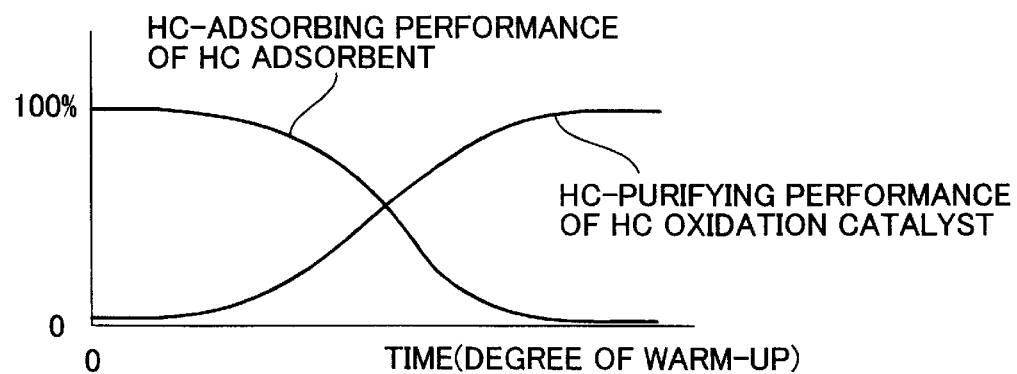
FIG. 1 is a diagram showing how the HC-holding performance of an HC adsorbent and the HC-purifying performance of an HC oxidation catalyst such as a three-way catalyst change with the lapse of time after cold start of an engine (with respect to the rise in temperature)

An HC adsorbing device (AB) 11 and a catalytic converter (CC) 12 are disposed in an exhaust system of the engine 1 in this order along the direction in which exhaust gas flows. The HC adsorbing device 11 includes an HC adsorbent that adsorbs and captures HC contained in exhaust gas. The catalytic converter 12 includes a three-way catalyst. As far as the invention is concerned, the catalytic converter 12 ought to function as an HC oxidation catalyst that oxidizes at least HC. Zeolite and the like are known as an HC adsorbent. Such an HC adsorbent performs the function of adsorbing and holding HC at a room temperature (atmospheric temperature), but loses the performance of adsorbing HC if heated up by engine exhaust gas as shown in FIG. 1. If the HC adsorbent adsorbs HC at a low temperature, it discharges the HC when heated up. The three-way catalyst contains noble metal components and performs the function of causing HC, CO, and NOx in engine exhaust gas to react with one another and converting them into $N_2$, $CO_2$, and $H_2O$. However, as shown in FIG. 1, the three-way catalyst performs that function only after it has been heated up by engine exhaust gas.

An electronic control unit (ECU) 13 in which a computer is installed controls the operations of the engine 1, the generator 3, the motor 4, and the transmission 5 as will be described below, and thus performs the operational control of the hybrid vehicle shown in FIG. 2 according to the invention. A signal indicating a depression amount Dp of an accelerator pedal and a signal indicating a vehicle speed Sv are input to the electronic control unit 13 as information for controlling the operation of the vehicle on the basis of the intention of a driver and the state of traveling. Furthermore, signals indicating an engine temperature Te, a rotational angle θe of an engine crank shaft, a temperature Tab of the HC adsorbing device 11, a temperature Tcc of the catalytic converter 12 are inputted to the electronic control unit 13 so as to suitably perform the operation control of the vehicle according to the invention.

It will now be described with reference to FIGS. 3 to 7 how the operation of the hybrid vehicle constructed as shown in FIG. 2 is performed while suppressing the discharge of HC according to a first embodiment of the invention.

Figure 3:
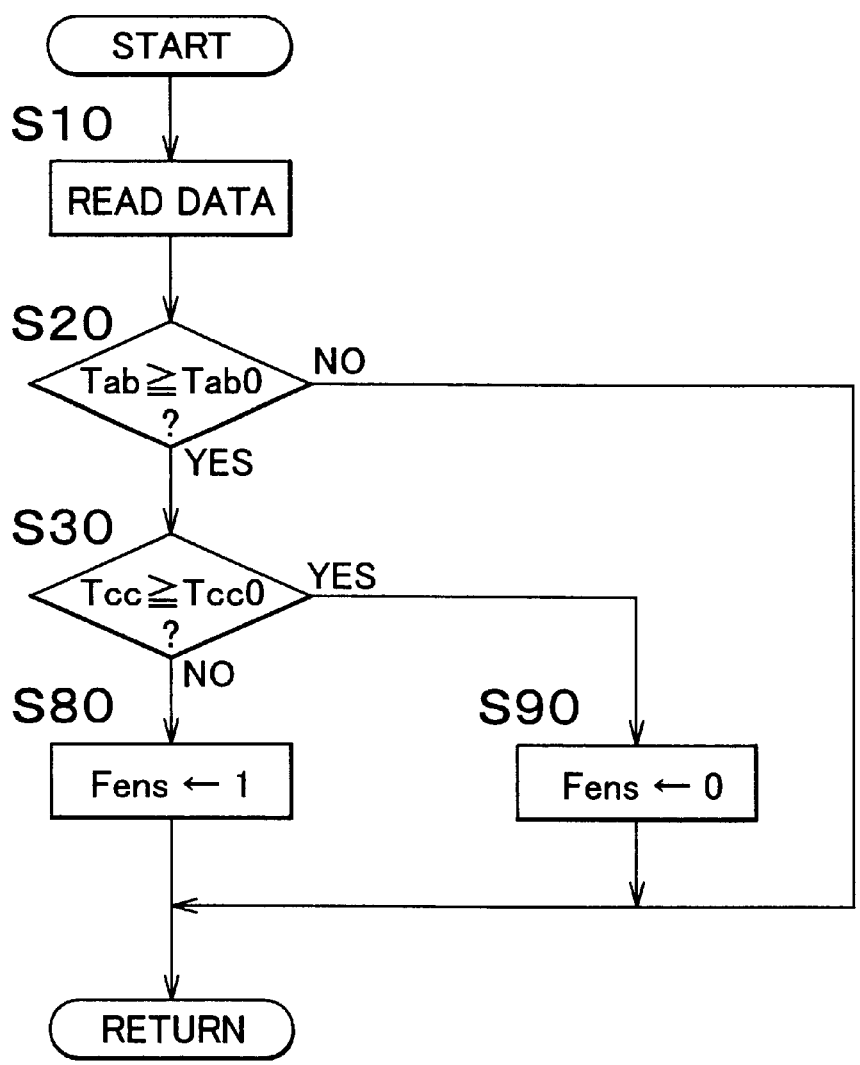
FIG. 3 is a flowchart showing a first embodiment in which the method of operating the HC-discharge suppressing device according to the invention is implemented in the hybrid vehicle shown in FIG. 2.

FIG. 3 is a flowchart showing the HC-discharge suppressing device and the method of operating the device according to the first embodiment of the invention. If it is assumed herein that the engine 1 is at a low temperature and that the operation of the vehicle is started by turning a key switch (not shown) on, the required data as shown in FIG. 2 are read in step 10. Then in step 20, it is determined on the basis of the read data whether or not the temperature Tab of the HC adsorbent in the HC adsorbing device 11 has reached a predetermined temperature Tab0 at which the HC adsorbing device 11 starts discharging the adsorbed HC. If the HC adsorbing device 11 has not been heated up to such a temperature by engine exhaust gas, the control returns to step 10 immediately. Then, the processings in step 10 and step 20 are repeated.

If the HC adsorbing device 11 is further heated up to such an extent that the HC adsorbent reaches the predetermined temperature Tab, the result in step 20 becomes positive. The control proceeds to step 30 where it is determined whether or not the temperature Tcc of the catalyst in the catalytic converter 12 has reached a predetermined temperature Tcc0 at which HC is oxidized sufficiently. If the catalytic converter 12 has not been heated up sufficiently so that the result in step 30 is negative, the control proceeds to step 80 where a flag Fens for prohibiting the engine 1 from being stopped (stopped temporarily) on the basis of a determination made by the electronic control unit 13 is set as 1. Even if it is determined in an arbitrary operational control process (not shown) of the hybrid vehicle performed by the electronic control unit 13 that the engine 1 is to be stopped temporarily, the engine 1 is prohibited from being stopped and continues to be in operation as long as the flag Fens is set as 1.

If the warm-up state of the exhaust system after cold start of the engine 1 has proceeded more or less toward an intersection point of the curves indicating the HC-adsorbing performance and the HC-purifying performance shown in FIG. 1, the operational control as described above makes an attempt to ensure that the warm-up state of the exhaust system will pass through a region in the neighborhood of the intersection point of the curves as quickly as possible without loitering thereabout. This attempt suppresses the discharge of HC to the atmosphere, which is likely when the engine is started at a low temperature. It is appropriate that the flag Fens that has been set as 1 in step 80 be reset as 0 in step 90 as soon as the temperature Tcc of the catalyst reaches the temperature Tcc0.

Figure 4:
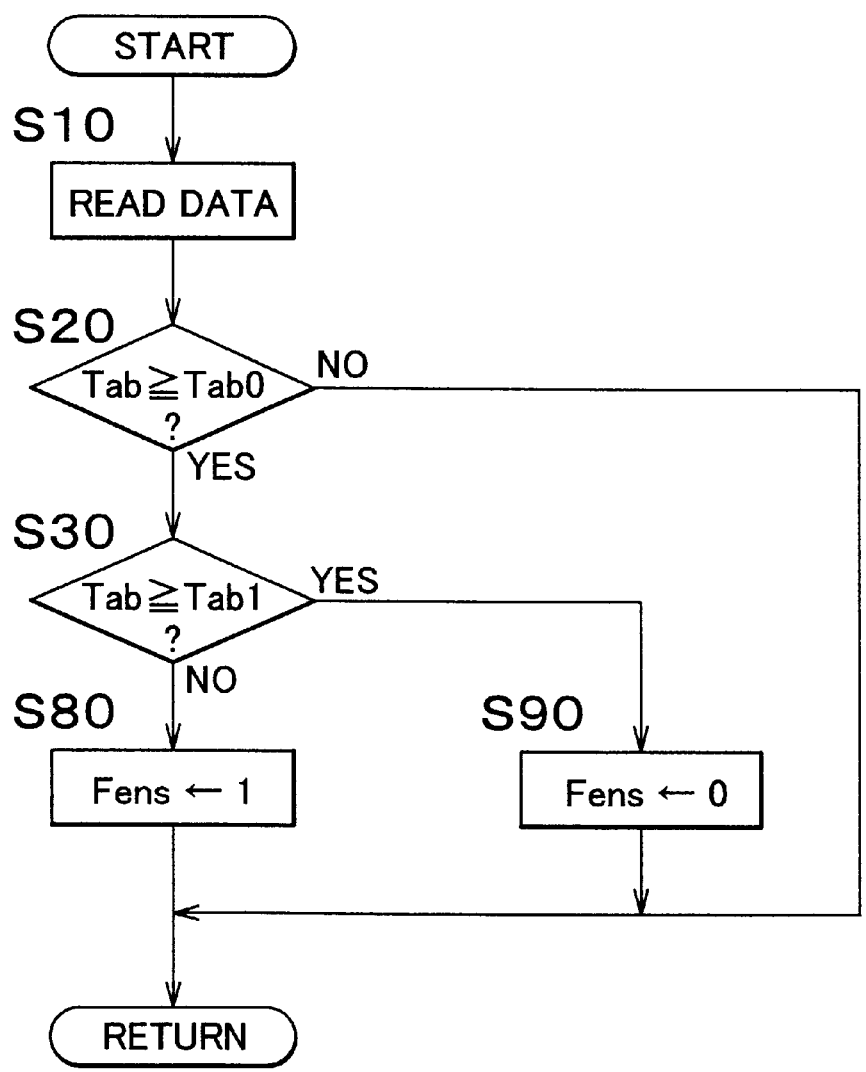
FIG. 4 is a flowchart showing a second embodiment in which the method of operating the HC-discharge suppressing device according to the invention is implemented in the hybrid vehicle shown in FIG. 2.

FIG. 4 is a flowchart similar to the one shown in FIG. 3 and shows the method of operating the HC-discharge suppressing device according to the second embodiment of the invention. It is assumed also herein that the engine 1 is at a low temperature and that the operation of the vehicle is started by turning the key switch (not shown) on. The control processings performed in step 10 and step 20 are identical with those shown in FIG. 3. In the second embodiment, if the result in step 20 is positive, the control proceeds to step 40 where it is determined whether or not the temperature Tab of the HC adsorbent has reached a predetermined temperature Tab1, which is higher than Tab0 and at which the adsorbed HC is estimated to have been discharged sufficiently. As long as the result in step 40 is negative, the control proceeds to step 80 where the flag Fens for prohibiting the engine 1 from being stopped (stopped temporarily) is set as 1.

This embodiment is also designed such that, if the warm-up state of the exhaust system after the cold start of the engine 1 has proceeded more or less toward the intersection point of the curves indicating the HC-adsorbing performance and the HC-purifying performance shown in FIG. 1, the control as described above makes an attempt to ensure that the warm-up state of the exhaust system will pass through the region in the neighborhood of the intersection point of the curves as quickly as possible without loitering thereabout. This attempt suppresses the discharge of HC to the atmosphere, which is likely when the engine is started at a low temperature. It is appropriate also herein that the flag Fens that has been set as 1 in step 80 be reset as 0 in step 90 if it is determined that the temperature Tab of the HC adsorbent has reached the predetermined temperature Tab1 at which the adsorbed HC is estimated to have been discharged sufficiently.

Figure 5:
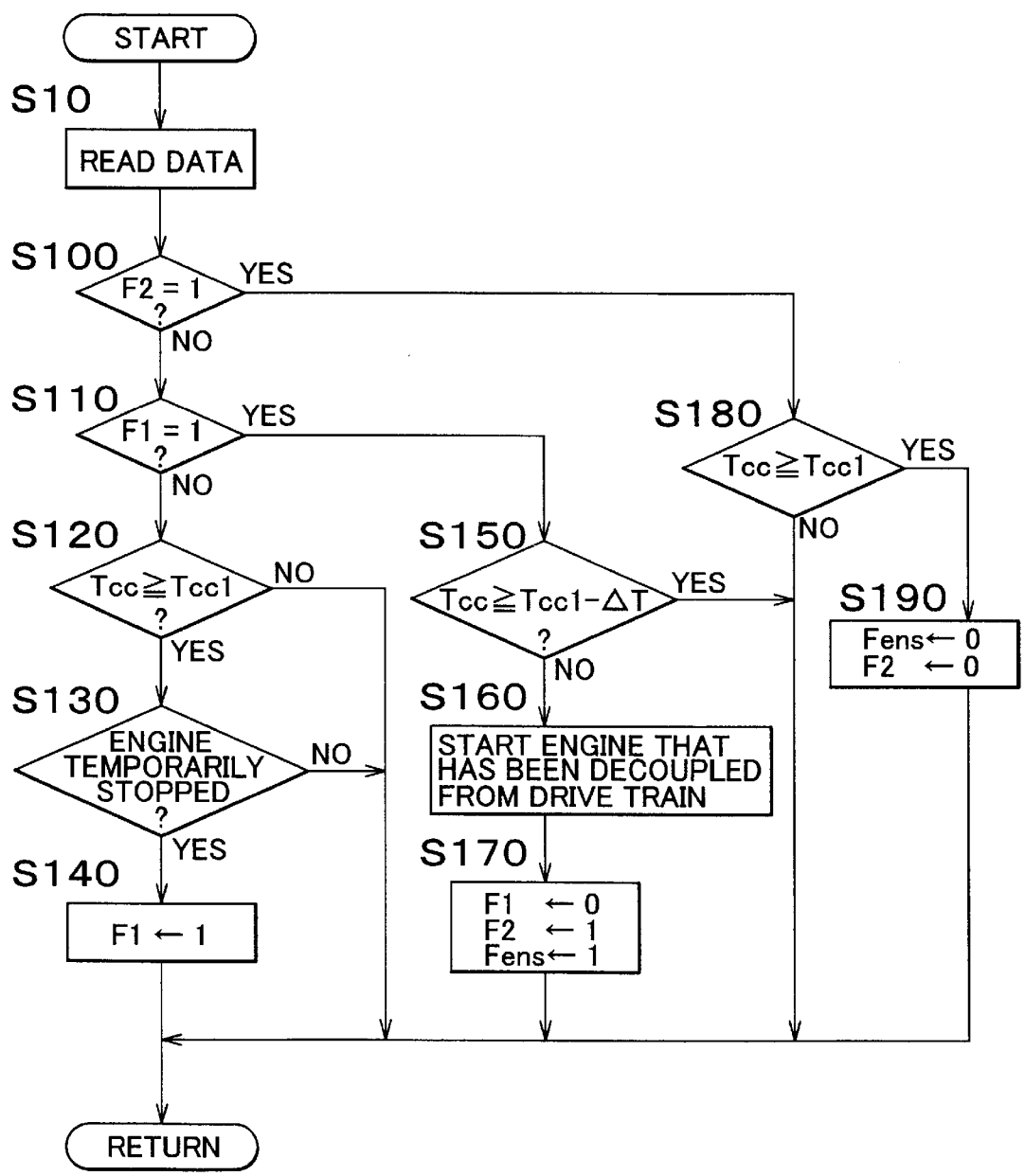
FIG. 5 is a flowchart showing a third embodiment in which the method of operating the HC-discharge suppressing device according to the invention is implemented in the hybrid vehicle shown in FIG. 2.

FIG. 5 is a flowchart similar to those shown in FIGS. 3 and 4 and shows the method of operating the HC-discharge suppressing device according to the third embodiment of the invention. It is assumed also herein that the engine 1 is at a low temperature and that the operation of the vehicle is started by turning the key switch (not shown) on. The control processing performed in step 10 is identical with that shown in FIGS. 3 and 4. Then, it is determined in step 100 whether or not a flag F2 has been set as 1. The flag F2 is set as 1 when the control reaches later-described step 170. As is customary in the control of this type, the flag F2 is reset as 0 every time the control is started, and remains unchanged until the control proceeds to step 170. Accordingly, the result in step 100 is negative unless the control has reached this step through step 170. Thus, the control proceeds to step 110.

It is determined in step 110 whether or not a flag F1 has been set as 1. The flag F1 is set as 1 when the control reaches later-described step 140. For the same reason as described above in regard to the flag F2, the flag F1 is maintained at 0 until the control reaches step 140. Thus, if the control reaches step 110 for the first time, the result is negative. Thus, the control proceeds to step 120 where it is determined whether or not the temperature Tcc of the catalyst of the catalytic converter 12 has reached a predetermined temperature Tcc1 at which HC is oxidized sufficiently. If the result in step 120 is negative, the control returns to step 10 immediately. If the result in step 120 is positive, the control proceeds to step 130 where it is determined whether or not the engine 1 has been stopped temporarily on the basis of a determination made by the electronic control unit 13 during the operational control of the vehicle. The control returns to step 10 immediately unless the engine 1 is stopped temporarily. If the engine 1 is stopped temporarily, the control proceeds to step 140 where the flag F1 is set as 1.

If the flag F1 is set as 1 as a result of temporary stoppage of the engine 1, the control proceeds from step 110 to step 150 afterwards. It is determined in step 150 whether or not the temperature Tcc of the catalyst in the catalytic converter 12 is maintained equal to or higher than a critical temperature Tcc1-ΔT, which is lower than the predetermined temperature Tcc1 by a predetermined temperature difference ΔT and above which it is inappropriate for the catalytic converter 12 to accomplish sufficient purification of HC. As long as the result in step 150 is positive, the control returns to step 10 immediately. If the result in step 150 is negative, the control proceeds to step 160 where the engine 1 that has been decoupled from the drive train of the vehicle and that has been stopped temporarily is started. The operation of the engine 1 started herein is preferably designed to suit the purpose of suppressing a further drop in temperature of the catalytic converter 12 while minimizing the amount of fuel consumption. For example, it is appropriate to adopt such an engine cycle that the temperature of exhaust gas rises on the basis of a retarded ignition timing. This makes it possible to prevent the catalytic converter 12 from being cooled excessively during temporary stoppage of the engine 1 to such an extent that the purification of HC is performed insufficiently and that the HC is discharged to the atmosphere. If the control reaches step 160, the engine 1 is started. Then in step 170, the flag F1 is reset as 0 and the flag F2 is set as 1. Also, the same flag as in the embodiment shown in FIGS. 3 and 4, that is, the flag Fens for prohibiting the engine 1 from being stopped is set as 1.

After the control has passed through step 160 and step 170, the result in step 100 is positive. Therefore, the control then proceeds from step 100 to step 180 where it is determined whether or not the temperature Tcc of the catalyst has again become equal to or higher than the predetermined temperature Tcc1. If the result in step 180 is negative, the control remains unchanged. In other words, at least the operation of the engine 1 is performed without interruption. If it is confirmed in step 180 that the catalytic converter 12 has been warmed up by exhaust gas flowing from the engine 1 that is in operation and that the temperature Tcc has again become equal to or higher than the predetermined temperature Tcc1, the control proceeds to step 190 where the flag Fens for prohibiting the engine 1 from being stopped is reset as 0 and where the flag F2 is also reset as 0. Then, the control returns to its initial state.

Figure 6:
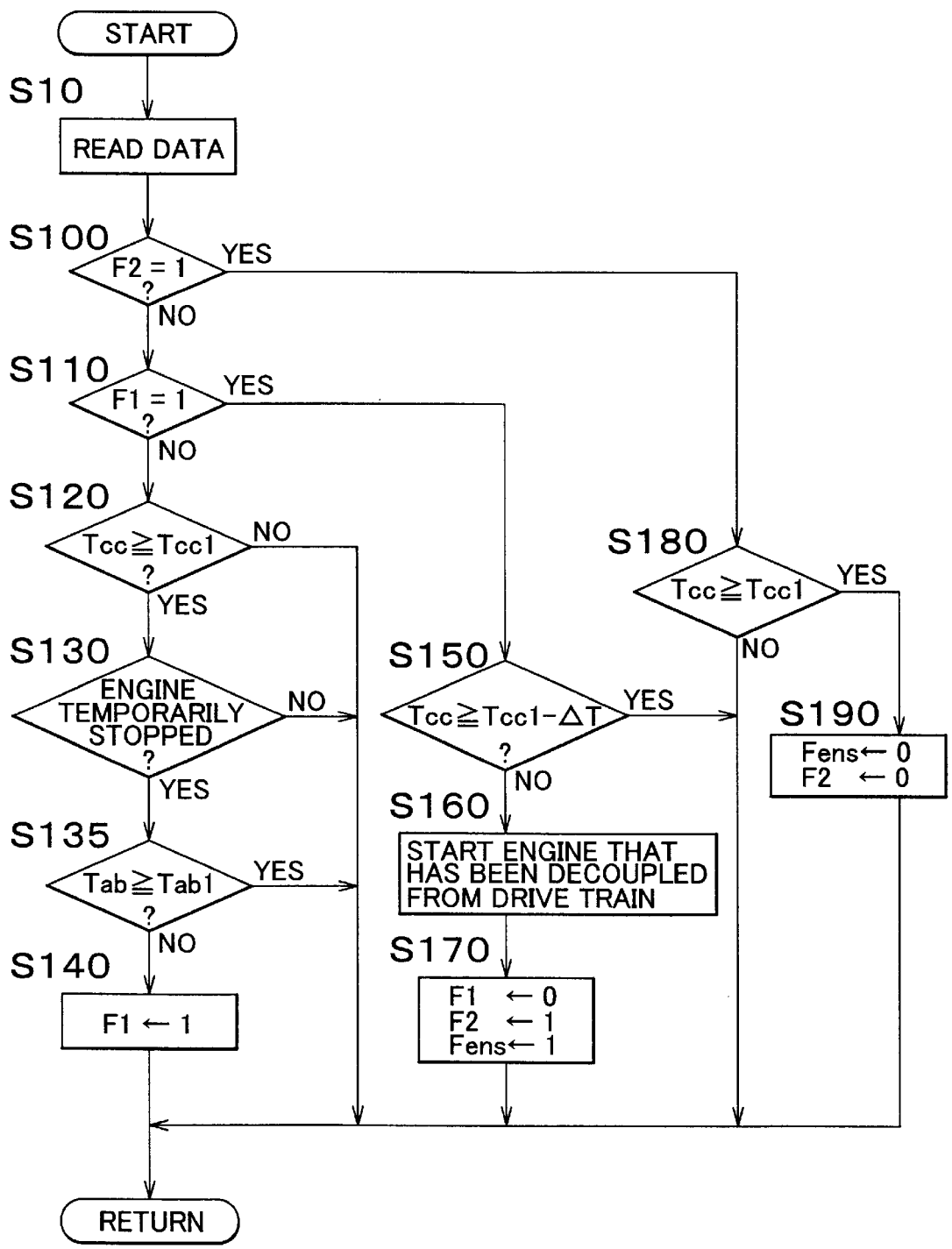
FIG. 6 is a flowchart showing a fourth embodiment in which the method of operating the HC-discharge suppressing device according to the invention is implemented in the hybrid vehicle shown in FIG. 2.

FIG. 6 is a flowchart similar to that shown in FIG. 5 and shows the method of operating the HC-discharge suppressing device according to the fourth embodiment of the invention. This embodiment further includes step 135, which is interposed between step 130 and step 140 in the flowchart of the third embodiment shown in FIG. 5. The fourth embodiment is designed as follows. If the results in step 120 and step 130 are positive, it is determined in step 135 whether or not the temperature Tab of the HC adsorbent has reached the predetermined temperature Tab1, which plays the same role as the temperature Tab1 in step 40 of FIG. 4 and at which the adsorbed HC is estimated to have been discharged sufficiently. If the result in step 135 is negative, the control proceeds to step 140. If the result in step 135 is positive, the control immediately returns to the initial state prior to the passage through step 10. This takes into account the fact that it is unclear whether or not the HC adsorbent is estimated to have discharged HC sufficiently even if it is determined in step 120 that the temperature Tcc of the catalytic converter 12 has reached the predetermined temperature Tcc1 that is sufficient to oxidize HC. It is determined in step 135 whether or not the temperature Tab of the HC adsorbent has reached the temperature Tab1, whereby it is determined whether or not the HC adsorbent has discharged HC sufficiently. If the temperature of the HC oxidation catalyst becomes equal to or lower than a predetermined temperature that is sufficient to oxidize HC after temporary stoppage of the engine 1, it is determined whether to start the engine 1 by determining whether or not the HC adsorbent has sufficiently discharged the HC that was adsorbed at the outset. If the HC adsorbent is estimated to have sufficiently discharged the HC that was adsorbed thereby at the outset, the engine 1 is not restarted after temporary stoppage thereof merely on the basis of a fall in temperature of the HC oxidation catalyst. As to the rest, the operation of the fourth embodiment shown in FIG. 6 is identical with the operation of the third embodiment shown in FIG. 5.

Figure 7:
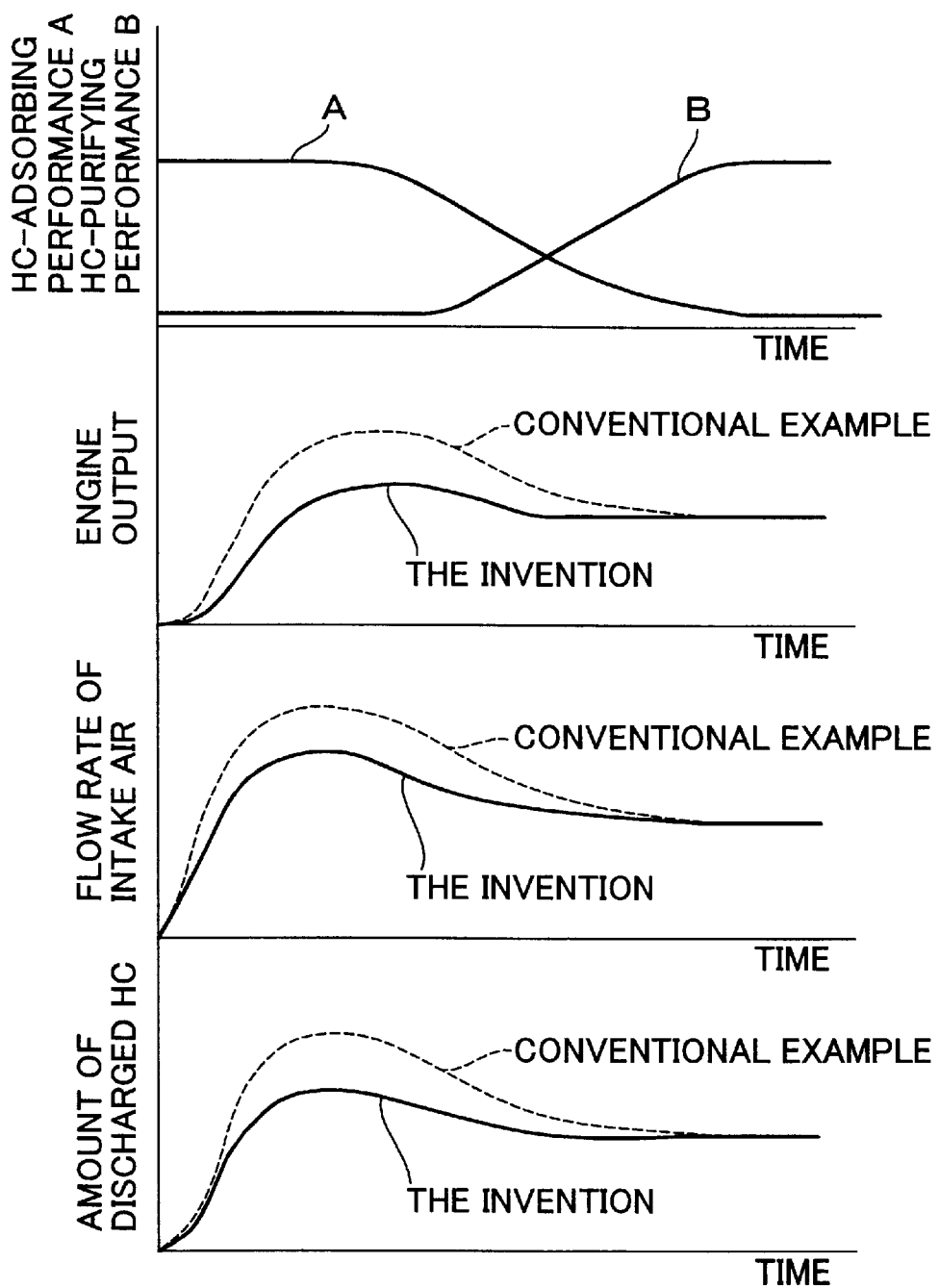
FIG. 7 is a diagram showing how changes in the HC-adsorbing performance of the HC adsorbent and the HC-purifying performance of the HC oxidation catalyst are correlated to changes in engine output, the flow rate of intake air, and the amount of discharged HC with the lapse of time after cold start of the engine.

FIG. 7 is a graph showing the method of operating the HC-discharge suppressing device according to the invention from a different angle. As shown in FIG. 1, the HC adsorbent is heated by engine exhaust gas after cold start of the engine 1 and thus gradually loses its HC-adsorbing performance with the lapse of time. On the other hand, the HC oxidation catalyst gradually gains its HC-purifying performance with the lapse of time. However, as is apparent from the top stage of FIG. 7, the gain in the HC-purifying performance is temporally retarded with respect to the loss in the HC-adsorbing performance.

On the other hand, changes in engine output, the flow rate of intake air, and the amount of discharged HC occurring with the lapse of time after cold start of the engine 1 are generally indicated by broken lines in the second, third, and fourth stages of the graph shown in FIG. 7 respectively. That is, if a conventional engine as employed generally is started at a low temperature, the rotational speed of the engine temporarily rises to a high speed so that the phenomenon of so-called blow-up occurs. The phenomenon of blow-up occurs immediately after the start of the engine even in the case where the control of deliberately increasing the amount of fuel injection momentarily is not performed. This is because of the following reason. Namely, when the engine is driven by a starter, injected fuel does not burn from the outset. If a certain amount of fuel accumulates, it starts burning at a time. If the engine starts self-explosion, the driving force of the starter is added to an autonomously created rotational force.

The phenomenon of blow-up occurring immediately after the start of the engine as described above is desirable for the purpose of ensuring startability of the engine. However, the phenomenon of blow-up causes a large amount of HC to be discharged from cylinders of the engine while suppression of the discharge of HC to the atmosphere depends only on the absorption of HC by the HC adsorbent, and creates a possibility that the amount of HC captured by the HC adsorbent might be insufficient. Moreover, this is exactly when the HC-adsorbing performance of the HC adsorbent is about to deteriorate. If the phenomenon of blow-up during the start of the engine 1 is suppressed as indicated by solid lines in the second, third, and fourth stages of FIG. 7 in view of the aforementioned circumstances, the discharge of HC to the atmosphere is suppressed correspondingly. This is achieved by controlling the operation of the engine 1 such that the flow rate of exhaust gas comes into a range corresponding to an HC-adsorbing capacity of the HC adsorbent while the temperature of the HC adsorbent is in a temperature range allowing the absorption of HC while performing the operation of the engine 1 in a low-load steady state in which the amount of discharged HC is small.

To suppress the phenomenon of blow-up during the start of the engine 1, it is naturally appropriate that fuel injection during the start of the engine 1 be controlled variably with a view to achieving that purpose. Especially as in the case of the hybrid vehicle, if the driving force required of the vehicle is controlled to be distributed to the engine 1 and the motor 4 and if the driving for starting the engine 1 is carried out by the motor 4, the phenomenon of blow-up in the engine 1 can be suppressed by suitably controlling the output of the motor 4 during the initial driving of the engine 1 without performing any specific control of fuel injection during the start of the engine 1 for the purpose of suppressing the phenomenon of blow-up in the engine 1.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An operational method of suppressing the discharge of HC in a vehicle equipped with an internal combustion engine that is stopped temporarily upon fulfillment of a predetermined condition for operating the vehicle, which is provided with an HC adsorbent disposed in an exhaust system of the internal combustion engine so as to adsorb HC discharged from the internal combustion engine and an HC oxidation catalyst disposed in the exhaust system so as to oxidize HC discharged from the internal combustion engine, the operational method comprising the steps of:

detecting a temperature of the HC adsorbent;

detecting a temperature of the HC oxidation catalyst; and operating the internal combustion engine after cold start thereof in accordance with the temperature of the HC adsorbent and the temperature of the HC oxidation catalyst, the temperatures of the HC adsorbent and the HC oxidation catalyst being independent from each other, in such a manner as to minimize the amount of HC discharged from the exhaust system to the atmosphere.

2. The operational method according to claim 1, wherein if, after cold start of the internal combustion engine, the temperature of the HC adsorbent has become equal to or higher than a predetermined temperature at which adsorbed HC is discharged but the temperature of the HC oxidation catalyst has not reached a predetermined temperature at which HC is oxidized sufficiently, the internal combustion engine is not stopped.

3. The operational method according to claim 2, wherein if, after cold start of the internal combustion engine, the temperature of the HC adsorbent is within a temperature range in which HC is adsorbed, the operation of the internal combustion engine is controlled such that the flow rate of exhaust gas flowing therethrough comes into a range corresponding to an HC-adsorbing capacity of the HC adsorbent.

4. The operational method according to claim 3, wherein if, after cold start of the internal combustion engine, the temperature of the HC oxidation catalyst has not reached the predetermined temperature at which HC is oxidized sufficiently, the operation of the internal combustion engine is performed in a low-load steady state in which the amount of discharged HC is small.

5. The operational method according to claim 2, wherein if, after cold start of the internal combustion engine, the temperature of the HC oxidation catalyst has not reached the predetermined temperature at which HC is oxidized sufficiently, the operation of the internal combustion engine is performed in a low-load steady state in which the amount of discharged HC is small.

6. The operational method according to claim 1, wherein if, after cold start of the internal combustion engine, the temperature of the HC adsorbent has temporarily risen to become equal to or higher than the predetermined temperature at which adsorbed HC is discharged, the internal combustion engine is not stopped until the temperature of the HC adsorbent reaches a predetermined temperature at which the adsorbed HC is estimated to have been discharged sufficiently.

7. The operational method according to claim 6, wherein if, after cold start of the internal combustion engine, the temperature of the HC adsorbent is within a temperature range in which HC is adsorbed, the operation of the internal combustion engine is controlled such that the flow rate of exhaust gas flowing therethrough comes into a range corresponding to an HC-adsorbing capacity of the HC adsorbent.

8. The operational method according to claim 6, wherein if, after cold start of the internal combustion engine, the temperature of the HC oxidation catalyst has not reached the predetermined temperature at which HC is oxidized sufficiently, the operation of the internal combustion engine is performed in a low-load steady state in which the amount of discharged HC is small.

9. The operational method according to claim 1, wherein if, after cold start of the internal combustion engine, the temperature of the HC oxidation catalyst has reached a first predetermined temperature at which HC is oxidized sufficiently, and if, after stoppage of the internal combustion engine, the temperature of the HC oxidation catalyst has fallen to become equal to or lower than a second predetermined temperature at which HC is oxidized sufficiently, the internal combustion engine is started.

10. The operational method according to claim 9, wherein if, after cold start of the internal combustion engine, the temperature of the HC adsorbent is within a temperature range in which HC is adsorbed, the operation of the internal combustion engine is performed such that the flow rate of exhaust gas flowing therethrough comes into a range corresponding to an HC-adsorbing capacity of the HC adsorbent.

11. The operational method according to claim 9, wherein if, after cold start of the internal combustion engine, the temperature of the HC oxidation catalyst has not reached the predetermined temperature at which HC is oxidized sufficiently, the operation of the internal combustion engine is performed in a low-load steady state in which the amount of discharged HC is small.

12. The operational method according to claim 9, wherein the second predetermined temperature is lower than the first predetermined temperature.

13. The operational method according to claim 1, wherein even if, after cold start of the internal combustion engine, the temperature of the HC oxidation catalyst has reached a first predetermined temperature at which HC is oxidized sufficiently, and even if, after stoppage of the internal combustion engine, the temperature of the HC oxidation catalyst has fallen to become equal to or lower than a second predetermined temperature at which HC is oxidized sufficiently, the internal combustion engine is not started as long as the HC adsorbent is estimated to have sufficiently discharged the HC that was adsorbed at the outset.

14. The operational method according to claim 13, wherein the second predetermined temperature is lower than the first predetermined temperature.

15. The operational method according to claim 1, wherein if, after cold start of the internal combustion engine, the temperature of the HC adsorbent is within a temperature range in which HC is adsorbed, the operation of the internal combustion engine is performed such that the flow rate of exhaust gas flowing therethrough comes into a range corresponding to an HC-adsorbing capacity of the HC adsorbent.

16. The operational method according to claim 15, wherein if, after cold start of the internal combustion engine, the temperature of the HC oxidation catalyst has not reached the predetermined temperature at which HC is oxidized sufficiently, the operation of the internal combustion engine is performed in a low-load steady state in which the amount of discharged HC is small.

17. The operational method according to claim 1, wherein if, after cold start of the internal combustion engine, the temperature of the HC oxidation catalyst has not reached the predetermined temperature at which HC is oxidized sufficiently, the operation of the internal combustion engine is performed in a low-load steady state in which the amount of discharged HC is small.

18. An HC-discharge suppressing device for a vehicle equipped with an internal combustion engine that is stopped temporarily upon fulfillment of a predetermined condition for operating the vehicle, the HC-discharge suppressing device comprising:

an HC adsorbent disposed in an exhaust system of the internal combustion engine so as to adsorb HC discharged from the internal combustion engine;

an HC oxidation catalyst disposed in the exhaust system so as to oxidize HC discharged from the internal combustion engine; and a controller for operating the internal combustion engine after cold start thereof in accordance with a temperature of the HC adsorbent and a temperature of the HC oxidation catalyst, the temperatures of the HC adsorbent and the HC oxidation catalyst being independent from each other, in such a manner as to minimize the amount of HC discharged from the exhaust system to the atmosphere.

19. The HC-discharge suppressing device according to claim 18, wherein if, after cold start of the internal combustion engine, the temperature of the HC adsorbent has become equal to or higher than a predetermined temperature at which adsorbed HC is discharged but the temperature of the HC oxidation catalyst has not reached a predetermined temperature at which HC is oxidized sufficiently, the controller refrains from stopping the internal combustion engine.

20. The HC-discharge suppressing device according to claim 18, wherein if, after cold start of the internal combustion engine, the temperature of the HC adsorbent has temporarily risen to become equal to or higher than the predetermined temperature at which adsorbed HC is discharged, the controller refrains from stopping the internal combustion engine until the temperature of the HC adsorbent reaches a predetermined temperature at which the adsorbed HC is estimated to have been discharged sufficiently.

21. The HC-discharge suppressing device according to claim 18, wherein if, after cold start of the internal combustion engine, the temperature of the HC oxidation catalyst has reached a first predetermined temperature at which HC is oxidized sufficiently, and if, after stoppage of the internal combustion engine, the temperature of the HC oxidation catalyst has fallen to become equal to or lower than a second predetermined temperature at which HC is oxidized sufficiently, the controller starts the internal combustion engine.

22. The HC-discharge suppressing device according to claim 18, wherein even if, after cold start of the internal combustion engine, the temperature of the HC oxidation catalyst has reached a first predetermined temperature at which HC is oxidized sufficiently, and even if, after stoppage of the internal combustion engine, the temperature of the HC oxidation catalyst has fallen to become equal to or lower than a second predetermined temperature at which HC is oxidized sufficiently, the controller refrains from starting the internal combustion engine as long as the HC adsorbent is estimated to have sufficiently discharged the HC that was adsorbed at the outset.

23. The HC-discharge suppressing device according to claim 18, wherein if, after cold start of the internal combustion engine, the temperature of the HC adsorbent is within a temperature range in which HC is adsorbed, the controller controls the operation of the internal combustion engine such that the flow rate of exhaust gas flowing therethrough comes into a range corresponding to an HC-adsorbing capacity of the HC adsorbent.

24. The HC-discharge suppressing device according to claim 18, wherein if, after cold start of the internal combustion engine, the temperature of the HC oxidation catalyst has not reached the predetermined temperature at which HC is oxidized sufficiently, the controller operates the internal combustion engine in a low-load steady state in which the amount of discharged HC is small.

* * * * *